United States Patent
Wachter et al.

(10) Patent No.: US 10,063,642 B2
(45) Date of Patent: Aug. 28, 2018

(54) METHOD AND APPARATUS FOR SUPPORTING LOCATION SERVICES VIA A GENERIC LOCATION SESSION

(75) Inventors: Andreas K. Wachter, San Carlos, CA (US); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 13/213,039

(22) Filed: Aug. 18, 2011

(65) Prior Publication Data

US 2012/0046014 A1 Feb. 23, 2012

Related U.S. Application Data

(60) Provisional application No. 61/375,824, filed on Aug. 21, 2010, provisional application No. 61/379,264, filed on Sep. 1, 2010.

(51) Int. Cl.
*H04L 29/08* (2006.01)
*G01S 19/11* (2010.01)
(Continued)

(52) U.S. Cl.
CPC ............ *H04L 67/141* (2013.01); *G01S 19/11* (2013.01); *G01S 19/46* (2013.01); *H04L 67/143* (2013.01);
(Continued)

(58) Field of Classification Search
CPC ..... H04W 4/02; H04W 64/00; H04W 64/003; H04W 80/085; H04W 80/10
(Continued)

(56) References Cited

U.S. PATENT DOCUMENTS 7,627,332 B2    12/2009 Shim
7,649,147 B2    1/2010 Xiao
(Continued)

FOREIGN PATENT DOCUMENTS

JP    2007532056 A    11/2007
JP    2008547263 A    12/2008
(Continued)

OTHER PUBLICATIONS

International Search Report and Written Opinion—PCT/US2011/048457—ISA/EPO—Feb. 21, 2012.
(Continued)

*Primary Examiner* — Jamie Holliday
(74) *Attorney, Agent, or Firm* — Berleley Law & Technology Group, LLP

(57) ABSTRACT

Techniques for supporting location services are disclosed. In an aspect, a generic location session between a terminal and a location server may be established for a particular duration or until the generic location session is terminated by a trigger condition. Parameters related to the generic location session may be exchanged between the terminal and the location server during session establishment. Thereafter, the terminal and the location server may engage in one or more positioning activities at any time during the generic location session. Each positioning activity may be of any type supported by the terminal and the location server. The generic location session can be initiated by either the terminal or the location server. In one design, one entity (e.g., the location server) may initiate the generic location session, and the other entity (e.g., the terminal) may send an end message to terminate the generic location session.

39 Claims, 6 Drawing Sheets

(51) Int. Cl.
*G01S 19/46* (2010.01)
*H04W 4/02* (2018.01)
*H04W 4/20* (2018.01)
*H04L 29/06* (2006.01)
*H04W 64/00* (2009.01)
*H04W 80/08* (2009.01)
*H04W 80/10* (2009.01)

(52) U.S. Cl.
CPC ............ *H04L 67/147* (2013.01); *H04L 67/18* (2013.01); *H04L 69/28* (2013.01); *H04W 4/02* (2013.01); *H04W 4/20* (2013.01); *H04W 64/00* (2013.01); *H04W 64/003* (2013.01); *H04W 80/085* (2013.01); *H04W 80/10* (2013.01)

(58) Field of Classification Search
USPC ............................................ 455/456.1–456.6
See application file for complete search history.

(56) References Cited

U.S. PATENT DOCUMENTS

| | | | |
|---|---|---|---|
| 8,099,112 B2* | 1/2012 | Krishnamurthi et al. | 455/456.6 |
| 8,145,769 B2 | 3/2012 | Edge et al. | |
| 8,626,926 B2 | 1/2014 | Burroughs et al. | |
| 9,125,018 B2 | 9/2015 | Wachter et al. | |
| 2005/0239480 A1* | 10/2005 | Kim et al. | 455/456.1 |
| 2006/0258371 A1* | 11/2006 | Krishnamurthi et al. | 455/456.1 |
| 2007/0037586 A1* | 2/2007 | Kim et al. | 455/456.1 |
| 2007/0082681 A1* | 4/2007 | Kim et al. | 455/456.1 |
| 2007/0182547 A1 | 8/2007 | Wachter et al. | |
| 2007/0238458 A1* | 10/2007 | Shim | 455/433 |
| 2008/0113671 A1* | 5/2008 | Ghozati | H04L 45/00 455/456.1 |
| 2008/0126535 A1* | 5/2008 | Zhu et al. | 709/224 |
| 2008/0228654 A1* | 9/2008 | Edge | G01S 19/48 705/71 |
| 2009/0036142 A1* | 2/2009 | Yan | H04W 60/00 455/456.1 |
| 2010/0035634 A1* | 2/2010 | Shim | 455/456.1 |
| 2010/0279706 A1 | 4/2010 | Dicke | |
| 2010/0228847 A1* | 9/2010 | Choi | G01S 5/0036 709/223 |
| 2010/0311348 A1 | 12/2010 | Aibara | |
| 2011/0059749 A1* | 3/2011 | Hefner et al. | 455/456.1 |
| 2011/0207469 A1* | 8/2011 | Hinds et al. | 455/456.1 |

FOREIGN PATENT DOCUMENTS

| | | |
|---|---|---|
| JP | 2009505480 A | 2/2009 |
| JP | 2010509889 A | 3/2010 |
| KR | 20090038341 A | 4/2009 |
| WO | WO03045101 A1 | 5/2003 |
| WO | WO-2005117295 A1 | 12/2005 |
| WO | WO07002303 | 1/2007 |
| WO | WO-2007018408 A1 | 2/2007 |
| WO | WO2007018409 | 2/2007 |
| WO | WO-2008063448 A1 | 5/2008 |
| WO | WO2008093998 A1 | 8/2008 |
| WO | WO-2009042938 A1 | 4/2009 |
| WO | WO-2009051339 A1 | 4/2009 |
| WO | WO-2009108585 | 9/2009 |
| WO | WO-2010091424 A2 | 8/2010 |

OTHER PUBLICATIONS

Wachter Andreas, Edge Stephen: "SUPL 3.0 Generic SUPL Session", OMA, Qualcomm, Aug. 20, 2010 (Aug. 20, 2010), XP002668873, Retrieved from the Internet: URL:http://member.openmobilealliance.org/ftp/public_documents/LOC/2010/OMA-LOC- 2010-0209-INP_SUPL_3.0_Generic_SUPL_Session.zip [retrieved on Feb. 6, 2012] p. 1-p. 8.

Wachter Andreas, Edge Stephen: "SUPL3.0 TS ULP Generci SUPL Service", OMA, Qualcomm, Aug. 20, 2010 (Aug. 20, 2010), XP002668876, Retrieved from the Internet: URL:http://member.openmobilealliance.org/ftp/public_documents/LOC/2010/OMA-LOC-2010-0210-CR_SIPL3.0_TS_ULP_Generic_SUPL_Service.zip [Retrieved on Feb. 6, 2012] the whole document.

URL:http://member.openmobilealliance.org/ftp/public_documents/LOC/2010/OMA-LOC-2010-0210-CR_SIPL3.0_TS_ULP_Generic_SUPL_Service.zip [Retrieved on Feb. 6, 2012] the whole document.

Goze, T. et al. (Aug. 2008). Secure User-Plane Location (SUPL) Architecture for Assisted GPS (A-GPS). IEEE 2008 Advanced Satellite Mobile Systems, 229-234.

Taiwan Search Report—TW100129902—TIPO—Feb. 18, 2014.

* cited by examiner

METHOD AND APPARATUS FOR SUPPORTING LOCATION SERVICES VIA A GENERIC LOCATION SESSION

CLAIM OF PRIORITY UNDER 35 U.S.C. § 119

The present application for patent claims the benefit of U.S. Provisional Application No. 61/375,824, entitled "Generic SUPL Session," filed Aug. 21, 2010, and U.S. Provisional Application No. 61/379,264, entitled "Generic SUPL Session," filed Sep. 1, 2010, both expressly incorporated herein by reference.

BACKGROUND

I. Field

The present disclosure relates generally to communication, and more specifically to techniques for supporting location services.

II. Background

It is often desirable, and sometimes necessary, to know the location of a terminal, e.g., a cellular phone. The terms "location" and "position" are synonymous and are used interchangeably herein. For example, a location services (LCS) client may desire to know the location of the terminal. The terminal may then communicate with a location server to obtain a location estimate for the terminal. The terminal or the location server may then return the location estimate to the LCS client.

A message flow (which may also be referred to as a call flow or a procedure) may be executed to establish a location session whenever the LCS client desires to know the location of the terminal. Various messages may be exchanged between the terminal and the location server via one or more network entities for the message flow. These messages may ensure that administrative/overhead tasks (e.g., authentication) can be performed. These messages may also ensure that each entity is provided with pertinent information in order to support positioning of the terminal. However, these messages add to the traffic at various entities, which may contribute to overloading of the network and may also drain a battery of the terminal.

SUMMARY

Techniques for efficiently supporting location services are described herein. In an aspect, a generic location session may be supported to enable more flexibility in providing location services and/or introducing new location services. A generic location session may be established between a terminal and a location server for a particular duration or lifetime, which may be quantified in various manners as described below. Parameters related to the generic location session may be exchanged between the terminal and the location server during session establishment. Thereafter, positioning activities may be initiated at any time during the lifetime of the generic location session, without having to exchange messages to establish a location session.

In one design, a generic location session between a terminal and a location server may be established for a particular duration or until the generic location session is terminated by a trigger condition. The terminal and the location server may thereafter engage in one or more positioning activities at any time during the generic location session. Each positioning activity may be any one of a plurality of positioning activity types supported by the terminal and the location server. In one design, the generic location session can be initiated by either the terminal or the location server. In one design, one entity (e.g., the location server) may initiate the generic location session, and the other entity (e.g., the terminal) may send an end message to indicate termination of the generic location session.

In one design, at least one parameter for the generic location session may be exchanged between the terminal and the location server during establishment of the generic location session. The at least one parameter may comprise the particular duration of the generic location session, an activity rate, etc.

In one design, the terminal may initiate the generic location session. In another design, the location server may initiate the generic location session. For both designs, the terminal and the location server may exchange their capabilities during session establishment and/or during the first positioning activity. Authentication may be performed during session establishment and not for each positioning activity.

In one design, the location server may determine that the terminal does not have a secure connection to the location server for a positioning activity. The location server may then send a reinit message to the terminal prior to the positioning activity to trigger the terminal to establish a secure connection to the location server. The terminal may establish a secure connection to the location server for the positioning activity in response to receiving the reinit message.

Various aspects and features of the disclosure are described in further detail below.

DETAILED DESCRIPTION

The techniques described herein may be used for user plane and control plane location solutions/architectures. A user plane location solution is a location solution that sends messages for location services via a user plane. A user plane is a mechanism for carrying signaling and data for higher-layer applications and employing a user-plane bearer, which is typically implemented with standard protocols such as User Datagram Protocol (UDP), Transmission Control Protocol (TCP), and Internet Protocol (IP). A control plane location solution is a location solution that sends messages for location services via a control plane. A control plane is a mechanism for carrying signaling for higher-layer applications and is typically implemented with network-specific protocols, interfaces, and signaling messages. Messages supporting location services are carried as part of signaling in a control plane location solution and as part of data (from the network perspective) in a user plane location solution.

The content of the messages may, however, be the same or similar in both user plane and control plane location solutions.

For clarity, certain aspects of the techniques are described below for Secure User Plane Location (SUPL) from Open Mobile Alliance (OMA). SUPL is a user plane location solution that is applicable for various wireless networks and wireline networks and is described in publicly available documents from OMA. For clarity, SUPL terminology is used in much of the description below.

Figure 1:
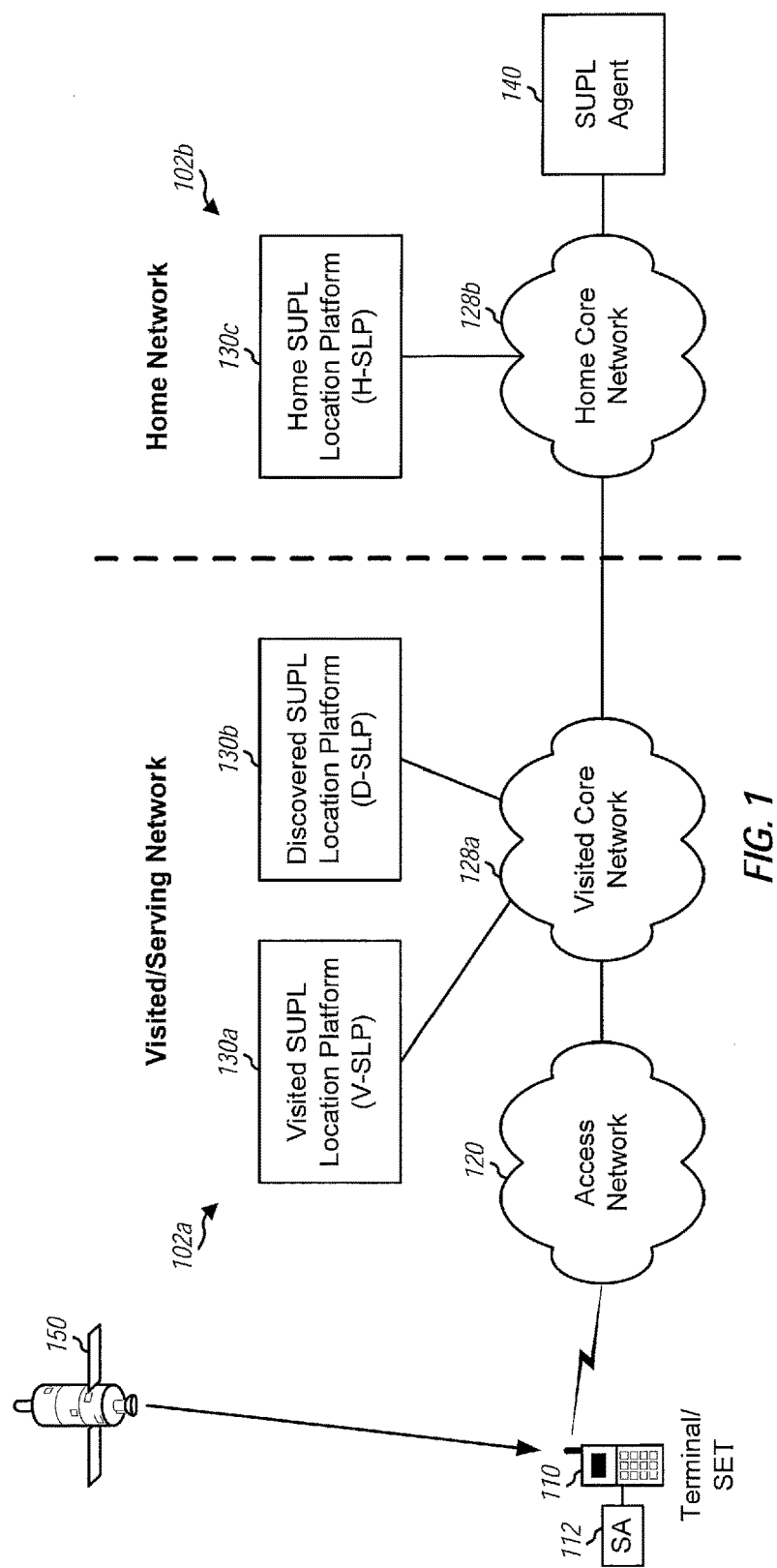
FIG. 1 shows an exemplary network deployment.

FIG. 1 shows an exemplary network deployment supporting location services. A terminal 110 may have service subscription with a home network 102b. However, terminal 110 may be roaming to a visited/serving network 102a. Terminal 110 may then communicate with visited network 102a to obtain communication services. In general, visited network 102a may be the same as home network 102b (not shown in FIG. 1) or may be different to home network 102b (as shown in FIG. 1).

Terminal 110 may be stationary or mobile and may also be referred to as a mobile station (MS), a user equipment (UE), an access terminal (AT), a subscriber station, a station, etc. Terminal 110 may be a cellular phone, a smart phone, a tablet, a personal digital assistant (PDA), a handheld device, a wireless device, a laptop computer, a wireless modem, a cordless phone, a telemetry device, a tracking device, etc. Terminal 110 may be referred to as a SUPL Enabled Terminal (SET) in SUPL. The terms "terminal" and "SET" are used interchangeably herein.

Visited network 102a may include an access network 120, a visited core network 128a, a Visited SUPL Location Platform (V-SLP) 130a, a Discovered SUPL Location Platform (D-SLP) 130b, and other network entities not shown in FIG. 1 for simplicity. Access network 120 may be a radio access network (RAN) (as shown in FIG. 1) or a wireline access network. A RAN may be a Code Division Multiple Access (CDMA) 1× network, a Wideband CDMA (WCDMA) network, a Global System for Mobile Communications (GSM) network, a Long Term Evolution (LTE) network, a wireless local area network (WLAN), etc. Core network 128a may include network entities that may support various communication services for terminals communicating with visited network 102a. V-SLP 130a may support location services for terminals communicating with visited network 102a (e.g., including terminals roaming to visited network 102a). V-SLP 130a may or may not require the terminals to have any service subscription or any prior relationship to V-SLP 130a. V-SLP 130a may communicate with a Home SLP (H-SLP) 130c of terminal 110 to support location services for terminal 110. D-SLP 130b may support location services for terminals communicating with visited network 102a, without having to communicate with the H-SLPs of these terminals. The address of D-SLP 130b may be discovered by terminal 110 (e.g., based on information provided by visited network 102a to terminal 110) and may then be verified to terminal 110 by H-SLP 130c following a query by terminal 110 to H-SLP 130c. Alternatively, the address and properties of D-SLP 130b may be provided to terminal 110 by H-SLP 130c, e.g., following a query by terminal 110 to H-SLP 130c or, in the absence of a query, if H-SLP 130c determines that terminal 110 is at a location or using a visited network at which or for which D-SLP 130b can provide better location services than H-SLP 130c.

Home network 102b may include a home core network 128b, H-SLP 130c, and other network entities not shown in FIG. 1 for simplicity. Core network 128b may include network entities that may support various communication services for terminals communicating with or belonging to home network 102b. H-SLP 130c may support location services for terminals having service subscription with home network 102b.

V-SLP 130a, D-SLP 130b, and H-SLP 130c may support location services for SETs. Location services may include any services based on or related to location. Location services may include positioning, which is a process to determine a geographic or civil location estimate for a target SET. A target SET is a SET for which location information is sought. A location estimate may also be referred to as a position estimate, a position fix, etc. Positioning may provide (i) latitude, longitude, and possibly altitude coordinates and an uncertainty for a geographic location estimate, (ii) a street address for a civil location estimate, and/or (iii) velocity and/or other information.

An SLP may include a SUPL Location Center (SLC) and a SUPL Positioning Center (SPC). The SLC may support location services, coordinate the operation of SUPL, and interact with SETs over user plane bearer. The SLC may perform functions for privacy, initiation, security, roaming support, charging/billing, service management, location calculation, etc. The SPC may support positioning for SETs and delivery of assistance data to the SETs and may also be responsible for messages and procedures used for location calculation. The SPC may perform functions for security, assistance data delivery, reference retrieval, location calculation, etc. The SPC may support positioning protocol messages transferred within SUPL messages.

A SUPL agent 140 may be a location services (LCS) client and may communicate with H-SLP 130c or D-SLP 130b (e.g., directly or via one or more networks) to obtain location information for target SETs. Location information may comprise a location estimate and/or any information related to location or velocity. Terminal 110 may also have a SUPL agent (SA) 112 residing on or connected to the terminal.

Terminal/SET 110 may receive and measure signals from satellites such as a satellite 150 to obtain pseudo-range measurements for the satellites. The satellites may be part of the United States Global Positioning System (GPS), the European Galileo system, the Russian GLONASS system, or some other global navigation satellite system (GNSS). The pseudo-range measurements and the known locations of the satellites may be used to derive a location estimate for terminal 110. Terminal 110 may also receive and measure signals from base stations within access network 120 and/or other networks in the same geographic area. Terminal 110 may obtain identity information, timing measurements, signal quality, and/or signal strength measurements for these base stations. The identity information, timing measurements, signal quality, and/or signal strength measurements and the known locations of the base stations may be used to derive a location estimate for terminal 110. In general, a location estimate may be derived based on identity information and measurements for satellites, base stations, pseudolites, and/or other transmitters.

Terminal/SET 110 as well as each SLP 130 may support one or more positioning protocols. A positioning protocol may define (i) procedures that may be executed by a target SET and a SLP and (ii) communication or signaling between the target SET and the SLP. For example, SET 110 may support Radio Resource LCS Protocol (RRLP), Radio Resource Control (RRC), LTE Positioning Protocol (LPP), LPP Extensions (LPPe), C.S0022 (also known as TIA-801), some other positioning protocol, or a combination thereof. RRLP, RRC and LPP are defined by an organization named "3rd Generation Partnership Project" (3GPP). TIA-801 is defined by an organization named "3rd Generation Partnership Project 2" (3GPP2). LPPe is defined by OMA.

SUPL Version 2.0 (SUPL 2.0) and SUPL Version 3.0 (SUPL 3.0) support various location services such as immediate location service, periodic trigger location service, area event trigger location service, retrieval of historic locations, retrieval of the location of one terminal by another terminal, transfer by a terminal of its location to a third party client, etc. SUPL 3.0 further supports velocity trigger location service, provision of an address of a D-SLP or an Emergency SLP (E-SLP) to a SET by an H-SLP of the SET or by a previously provided D-SLP or E-SLP, provision of a location Uniform Resource Identifier (URI) to a SET by an SLP, etc. For immediate location service, the location of a target SET may be determined immediately when requested and provided to a SUPL agent. For periodic trigger location service, the location of a target SET may be periodically determined and provided to a SUPL agent. For area event and velocity trigger location services, the location of a target SET may be determined periodically and provided to a SUPL agent when a trigger condition occurs, e.g., whenever the target SET is within a target area or enters or leaves the target area or whenever the velocity of the target SET is above or below a trigger velocity.

SUPL 2.0 and 3.0 also support various positioning activities. A positioning activity is a transaction related to a location service. Some examples of positioning activities include request and delivery of assistance data from an SLP, request and delivery of the current location of a SET from an SLP, request and delivery of measurements and/or location estimate from a SET, request and delivery of positioning capabilities of a SET or an SLP, unsolicited transfer of assistance data, location information, or positioning capabilities, etc. Some additional examples of positioning activities include request and delivery of the relative location of a SET, request and delivery of map data to a SET, request and delivery to a SET of information about nearby base stations, femtocells, Wi-Fi access points, and/or short range nodes such as Bluetooth devices, request and delivery of GNSS carrier phase measurements made by a SET or a GNSS reference receiver associated with an SLP, etc. These additional positioning activities are supported at a positioning protocol level with SUPL 3.0 and are supported indirectly by SUPL 3.0.

In SUPL 2.0 and earlier, a SUPL session may be established for a specific purpose or objective. A SUPL session may also be referred to as a location session, etc. A SUPL session may cover one or more positioning activities. For example, positioning activities such as request and delivery of assistance data may be preceded by explicit SUPL session establishment and, after one or more positioning activities, ended by SUPL session termination. This scheme of establishing and terminating a SUPL session for one or more positioning activities for a specific purpose is simple in concept and has worked in SUPL 2.0 and earlier. However, this scheme may be inefficient, may have high signaling overhead, and may cause significant delay in certain scenarios. For example, transfer of an initial SUPL message from an SLP to a SET may be inefficient (e.g., if using transfer based on Short Message Service (SMS)) and may also be associated with significant delay (e.g., queuing delay for SMS transfer in an SMS service center). In addition, mutual authentication between an SLP and a SET, which may be necessary to verify each party's identity to the other party before a SUPL session can safely begin, may require the exchange of multiple messages and the use of significant processing to support private or public key authentication methods.

In an aspect, a generic SUPL session (GSS) may be supported to enable more flexibility in providing location services and/or introducing new location services. A generic SUPL session may be a SUPL session created to provide a SUPL session framework for positioning activities between a SET and an SLP. A generic SUPL session may be established between a SET and an SLP for a particular duration or lifetime, which may be quantified in various manners as described below. Parameters related to the generic SUPL session may be exchanged between the SET and the SLP during session establishment. Thereafter, positioning activities may be initiated at any time during the lifetime of the generic SUPL session, without having to exchange messages to establish a SUPL session. The generic SUPL session may thus provide improved signaling efficiency in SUPL and may also allow for scheduling and guaranteed support for positioning activities in advance.

A generic SUPL session may be considered as an open SUPL session to be "filled" with positioning activities. The generic SUPL session may provide a SUPL session framework (e.g., for authentication, security, etc.) within which positioning activities may take place. Administrative and overhead functions such as authentication, secure session establishment, etc., may be performed once during session establishment. Positioning activities may occur at any time during the lifetime the generic SUPL session without the need to invoke these functions again.

Positioning activities within a generic SUPL session may be used by a SUPL agent to support complex location services that may not be supported directly by SUPL. For example, a SUPL agent may use a generic SUPL session to obtain the location and/or velocity of a SET at frequent intervals (e.g., every minute). The SUPL agent may then use the resulting locations and/or velocities to determine whether trigger conditions have occurred, e.g., whether the SET location or velocity has changed by more than a predefined value, whether the location of a SET relative to a fixed point or another SET is less than or more than a predefined value, or whether the SET location is changing according to a predefined pattern such as returning to a previous location or heading in a fixed direction for a predefined minimum time. The occurrence of a trigger condition and the associated SET location and velocity may then be reported by the SUPL agent to another LCS client that does not have the capability to determine these trigger conditions itself. These trigger conditions are not supported directly in SUPL (e.g., cannot be supported by a SET or an SLP using SUPL capabilities alone) and may consume excessive resources in a network, the SET, and the SLP if supported using a sequence of normal SUPL session such as those defined in SUPL 2.0. However, by taking advantage of the additional flexibility and efficiency of a generic SUPL session, these trigger conditions may be supported efficiently and may enable a wide range of SUPL based services to be supported by a SUPL agent.

In one design, a generic SUPL session may be established by either a SET or an SLP. For SET-initiated GSS, a SET may initiate establishment of a generic SUPL session. For network-initiated GSS, an SLP may initiate establishment of a generic SUPL session, e.g., in response to a request from a SUPL agent. A generic SUPL session may co-exist with other SUPL sessions and/or other generic SUPL sessions.

In one design, a generic SUPL session may be associated with a single SUPL agent, which may be the SUPL agent that triggers establishment of the generic SUPL session. In this design, positioning activities may be initiated by only the associated SUPL agent. In another design, positioning activities may be initiated by any SUPL agent in a generic SUPL session.

Figure 2:
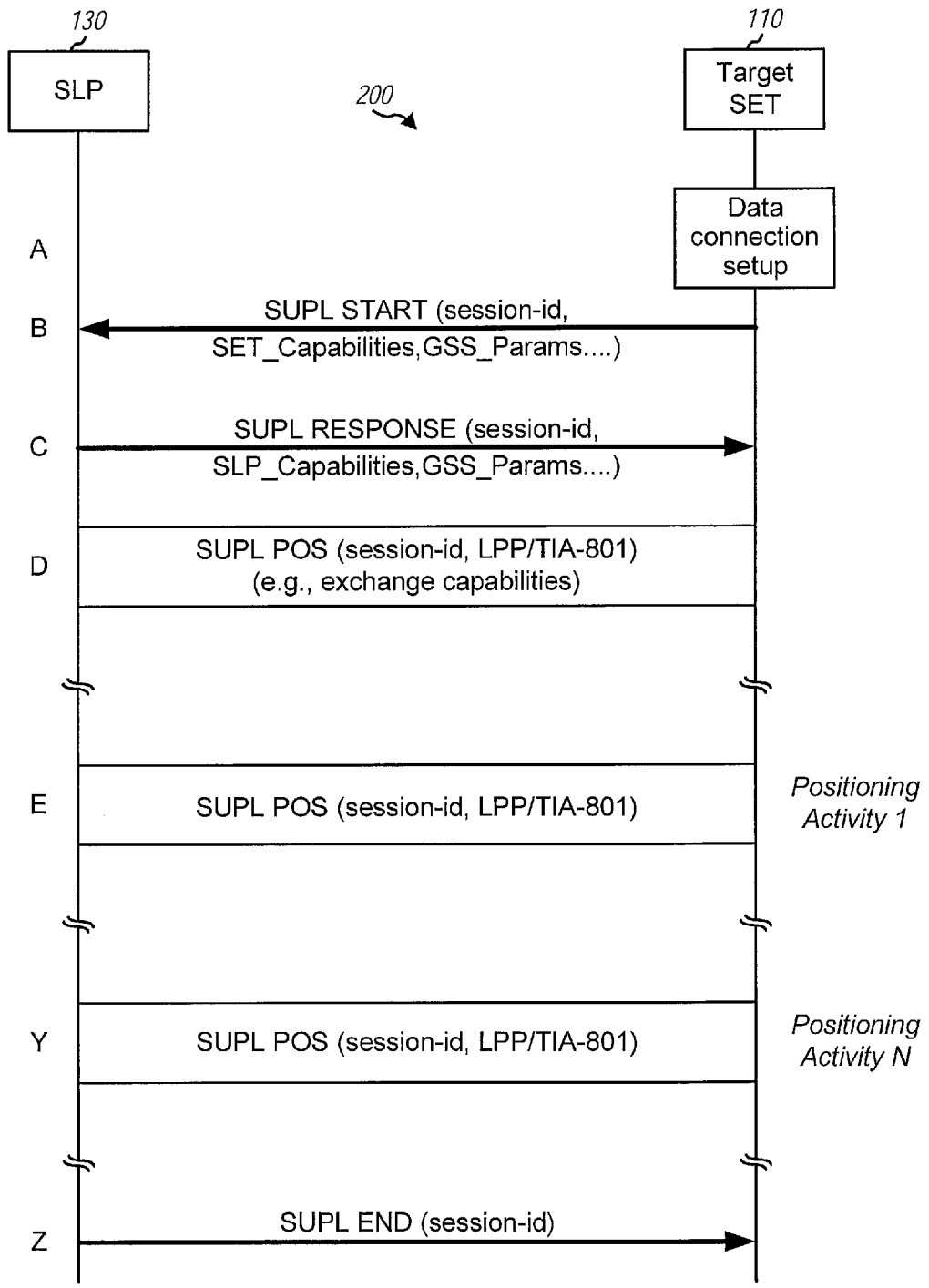
FIG. 2 shows a message flow for a terminal-initiated generic location session.

FIG. 2 shows a design of a message flow 200 for a SET-initiated generic SUPL session. SUPL agent 112 on SET 110 may desire to obtain location services and may request establishment of a generic SUPL session. Alternatively, SUPL agent 112 on SET 110 may request a location service that SET 110 may decide to support using a generic SUPL session, e.g., so as to allow subsequent location requests from SUPL agent 112 to be supported more efficiently and with lower delay and less resource usage. SET 110 may receive the request from SUPL agent 112 and may establish a secure connection to SLP 130 (step A). SLP 130 may be H-SLP 130c in FIG. 1 when SET 110 is either roaming or not roaming or may be D-SLP 130b when SET 110 is roaming.

SET 110 may send a SUPL START message to SLP 130 to start a generic SUPL session (step B). The SUPL START message may include various parameters such as a session identity (ID) of the generic SUPL session, a service request that is set to "GSS", the capabilities of SET 110 (SET_Capabilities), parameters for the generic SUPL session (GSS_Params), etc. The SET capabilities may include one or more positioning protocols supported by SET 110 (e.g., LPP/LPPe, TIA-801, etc). The GSS parameters may indicate the duration or lifetime of the generic SUPL session and/or other parameters for the generic SUPL session, as described below.

SLP 130 may receive the SUPL START message from SET 110, determine whether the generic SUPL session can be supported for SET 110, and respond with a SUPL RESPONSE message (step C). The SUPL RESPONSE message may include the session ID of the generic SUPL session, the capabilities of SLP 130 (SLP_Capabilities), GSS parameters accepted or proposed by SLP 130, etc. For example, the GSS parameters may indicate the duration or lifetime of the generic SUPL session accepted by SLP 130, which may be the same as or different from the duration or lifetime proposed by SET 110. The SLP capabilities may include one or more positioning protocols supported by SLP 130 (e.g., LPP/LPPe and/or TIA-801). The generic SUPL session may be established with a predefined lifetime or duration after step C. SUPL agent 112 may, at any time, request a position activity such as provision of assistance data, request for measurement and/or location, etc.

SET 110 and SLP 130 may exchange SUPL POS messages in order to exchange their positioning capabilities unless both entities already know each other's positioning capabilities (step D). The SUPL POS messages may carry the positioning capabilities as part of a positioning protocol payload (e.g., LPP or TIA-801). The positioning capabilities exchanged in step D may be those that SET 110 and SLP 130 are willing and able to use for the generic SUPL session. If SET 110 and SLP 130 already know each other's positioning capabilities, then step D may be skipped.

At any time during the generic SUPL session, SET 110 and SLP 130 may engage in a positioning activity, e.g., via an LPP/LPPe or TIA-801 session (step E). SET 110 and SLP 130 may exchange SUPL POS messages, which may carry or transport positioning messages to execute the positioning activity. In one design, the first SUPL POS message sent by SET 110 in step E may be sent embedded in a SUPL POS INIT message (not shown in FIG. 2) to signal to SLP 130 the start of a new positioning activity. In one design, only SUPL agent 112 which initiated the generic SUPL session may request or initiate a positioning activity. In another design, any SUPL agent associated with SET 110 may request a positioning activity. In yet another design, only SET 110 may initiate a positioning activity on behalf of a SUPL agent associated with SET 110. During positioning activity in step E, if SET 110 is roaming, SLP 130 may request location information for SET 110 from another SLP that is associated with an access network used by SET 110. For example, SLP 130 may request the location of a base station serving SET 110 from a V-SLP for the access network, such as V-SLP 130a in FIG. 1.

Step E may be repeated as required and at any time during the lifetime of the generic SUPL session. The last positioning activity is shown in step Y in FIG. 2. When the end of the generic SUPL session is reached, SLP 130 may send a SUPL END message to SET 110 to indicate termination of the generic SUPL session (step Z). SET 110 and SLP 130 may then release all resources related to the generic SUPL session.

The secure connection between SET 110 and SLP 130 may be released during the generic SUPL session before the session has been terminated, e.g., because there have been no positioning activities for some period of time. In this case, SET 110 may repeat step A (not shown in FIG. 2) to re-establish a secure connection to SLP 130 before the next positioning activity can take place.

Figure 3:
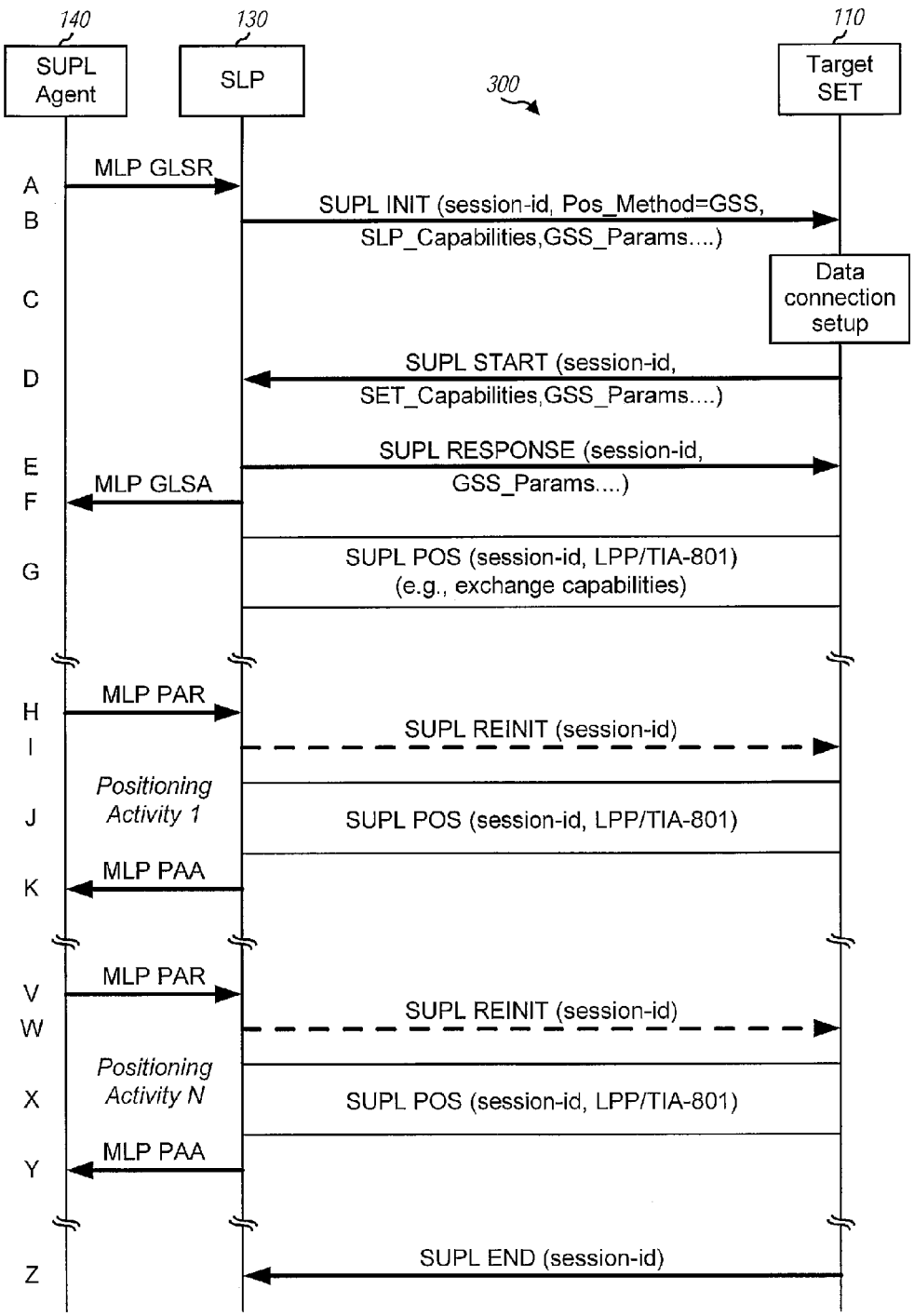
FIG. 3 shows a message flow for a network-initiated generic location session.

FIG. 3 shows a design of a message flow 300 for a network-initiated generic SUPL session. SUPL agent 140 may desire to obtain location services for target SET 110 and may send (i) a Mobile Location Protocol (MLP) Generic Location Service Request (GLSR) message to SLP 130 (step A) or (ii) some other MLP message to SLP 130 to request a location or series of locations for target SET 110 (not shown in FIG. 3). SLP 130 may be an SLP with which SUPL agent 140 is associated and may be H-SLP 130c or D-SLP 130b in FIG. 1. SLP 130 may authenticate SUPL agent 140 and determine whether SUPL agent 140 is authorized for the requested service, which in this case may be a generic SUPL session or some other SUPL location service. SLP 130 may also provide privacy checking to determine whether SET 110 should notify its user of the request from SUPL agent 140 and possibly allow the user to accept or reject the location request. SLP 130 may also verify whether SET 110 supports SUPL.

SLP 130 may establish a generic SUPL session based on an explicit request from SUPL agent 140, as shown in FIG. 3. SLP 130 may also establish a generic SUPL session based on other events or conditions, e.g., based on a location request from SUPL agent 140 and an expectation or indication of more location requests to follow from SUPL agent 140. In any case, SLP 130 may send a SUPL INIT message to SET 110 to request establishment of a generic SUPL session (step B). The SUPL INIT message may include various parameters such as a session ID of the generic SUPL session, a positioning method of "GSS", the capabilities of SLP 130, parameters (e.g., duration or lifetime) for the generic SUPL session, etc. The SLP capabilities may indicate one or more positioning protocols (LPP/LPPe or TIA-801) supported by SLP 130. The GSS parameters may define the desired duration of the generic SUPL session.

SET 110 may receive the SUPL UNIT message from SLP 130 and may establish a secure connection to SLP 130 (step C). SET 110 may determine whether the generic SUPL session can be supported and may respond with a SUPL START message (step D). The SUPL START message may include the session ID, the capabilities of SET 110, the GSS parameters (e.g., the duration or lifetime) accepted or proposed by SET 110, etc. The SET capabilities may indicate one or more positioning protocols supported by SET 110. The GSS parameters may indicate the duration of the generic SUPL session that SET 110 is willing and able to support. The SUPL START message may also include a "ver" parameter that contains a hash value calculated by SET 110 based on the binary content of the SUPL INIT message received in step B. SLP 130 may compare the received hash value with a hash value calculated by SLP 130. If the two hash values match, then SLP 130 can assume that SET 110 received the SUPL INIT message in step B.

SLP 130 may receive the SUPL START message from SET 110 and may send a SUPL RESPONSE message to SET 110 (step E). The SUPL RESPONSE message may include the session ID, the GSS parameters accepted or confirmed by SLP 130, etc. SLP 130 may send an MLP Generic Location Service Answer (GLSA) message to inform SUPL agent 140 that the generic SUPL session has been successfully established (step F). Alternatively, SLP 130 may send another MLP message to SUPL agent 140 in step F (e.g., to confirm that the location request in step A and possibly future location requests can be supported) or may not send any message to SUPL agent 140 at this point in the message flow. In any case, the generic SUPL session is now established with a predefined lifetime or duration. SUPL agent 140 may at any time request a position activity such as assistance data provisioning, measurement and/or location request, etc.

SET 110 and SLP 130 may exchange SUPL POS messages in order to exchange their positioning capabilities unless both entities already know each other's positioning capabilities (step G). The positioning capabilities exchanged in step G may be those that SET 110 and SLP 130 may be willing and able to use for the generic SUPL session. Step G may be skipped if SET 110 and SLP 130 already know each other's positioning capabilities.

At any time during the generic SUPL session, SET 110 and SLP 130 may engage in a positioning activity. For example, SUPL agent 140 (or some other SUPL agent) may send to SLP 130 an MLP Positioning Activity Request (PAR) message to request for location service (step H). If a SUPL agent, which is not the one that requested the generic SUPL session or some other location service in step A, requested for location service, then SLP 130 may authenticate the SUPL agent and check if the SUPL agent is authorized for the requested service. In one design, only the SUPL agent that sent the request in step A may be permitted by SLP 130 to instigate positioning activities using the generic SUPL session since only this SUPL agent may have been notified to SET 110 in step B and possibly approved by the user of SET 110. In another design, other SUPL agents may be permitted by SLP 130 to instigate positioning activities using the generic SUPL session, e.g., if SET 110 and the user of SET 110 were notified of this in step B or if this is a known default possibility for a generic SUPL session. In any case, SLP 130 may initiate a positioning session based on the request from SUPL agent 140. SLP 130 may also initiate a positioning session based on some other trigger event or condition. In general, a positioning session for a positioning activity may be initiated by SLP 130 by itself or based on a request from another entity.

SLP 130 may decide to engage in a positioning session (e.g., an LPP/LPPe or TIA-801 session) with SET 110, and a secure connection (e.g., a TCP/IP connection) to SET 110 may not be present. In this case, SLP 130 may send a SUPL REINIT message to SET 110 to trigger SET 110 to re-establish a secure connection to SLP 130 (step T). The SUPL REINIT message may be sent using SMS, Wireless Application Protocol (WAP) Push, Session Initiation Protocol (SIP) Push, UDP/IP or TCP/IP transfer, or some other mechanism, as described in document OMA-TS-ULP-V3, entitled "User Plane Location Protocol," which is publicly available. If step I is performed, then SET 110 may establish a secure connection to SLP 130 and then send a SUPL POS INIT message to SLP 130 (not shown in FIG. 3). This SUPL POS INIT message may include a SUPL POS message containing one or more positioning protocol messages. The SUPL POS INIT message may also include a "ver" parameter, which may contain a hash value calculated by SET 110 based on the binary content of the SUPL REINIT message sent in step I. This hash value may be compared by SLP 130 with a hash value previously calculated by SLP 130 for the SUPL REINIT message. If the two hash values match, then SLP 130 can assume that SET 110 received the SUPL REINIT message in step I. Step I may be skipped if a secure connection already exists between SET 110 and SLP 130.

SLP 130 and SET 110 may then exchange SUPL POS messages to execute the requested positioning activity (step J). The SUPL POS messages may carry/transport positioning messages, which may provide pertinent information for the positioning activity. Initial SUPL POS messages may be used if needed to provide SLP 130 with the access network type for SET 110, which may be used to select an appropriate positioning protocol (e.g., LPP or TIA-801) and suitable positioning methods. During the positioning activity in step E, if SET 110 is roaming, SLP 130 may request location information for SET 110 from some other SLP that is associated with the access network used by SET 110. For example, SLP 130 may request the location of a base station serving SET 110 from a V-SLP for the access network, such as V-SLP 130*a* in FIG. 1. After the positioning activity has been executed, SLP 130 may send to SUPL agent 140 an MLP Positioning Activity Response (PAA) message that may include the results of the positioning activity (step K).

Steps H to K may be repeated as appropriate and at any time during the lifetime of the generic SUPL session. The last positioning activity is shown in steps V to Y in FIG. 3. When the end of the generic SUPL session is reached, SET 110 may send a SUPL END message to SLP 130 to convey termination of the generic SUPL session (step Z). SET 110 and SLP 130 may then release all resources related to the generic SUPL session.

In the designs shown in FIGS. 2 and 3, a positioning activity may be supported by sending SUPL POS messages in one direction (e.g., from the SET to the SLP, or vice versa) or in both directions. The SUPL POS messages may carry/transport messages for a positioning protocol (e.g., LPP/LPPe, TIA-801, etc.), and the positioning protocol messages may carry information for a positioning activity. Positioning activities for a generic SUPL session may be executed serially or may partly or completely overlap one another.

In general, a generic SUPL session may be specified by or associated with various parameters. Table 1 lists a set of parameters that may be used for a generic SUPL session and provides a short description of each parameter. In Table 1, the first column lists the parameters and their fields and subfields, the second column indicates whether each parameter, field, or subfield is mandatory ("M") or optional ("O"), and the third column provides a short description of each parameter, field, and subfield. In Table 1, a parameter (e.g., duration) is preceded by a single arrow (">"). A field of a given parameter (e.g., the "time" field of the "duration" parameter) is preceded by a double arrow (">>"). A subfield of a given field (e.g., the "uplink" subfield of the "time" field) is preceded by a triple arrow (">>>"). Uplink refers to the direction from a SET to an SLP, and downlink refers to the direction from the SLP to the SET.

TABLE 1

Parameters for Generic SUPL Session

| Parameter | Presence | Description |
|---|---|---|
| >Duration | M | Duration of a generic SUPL session. |
| >>Time | O | Duration of the generic SUPL session in terms of time. |
| >>Number of SUPL POS messages | O | Duration of the generic SUPL session in terms of number of SUPL POS messages transferred. |
| >>>Uplink | O | Maximum number of SUPL POS messages allowed on the uplink in the generic SUPL session. |
| >>>Downlink | O | Maximum number of SUPL POS messages allowed on the downlink in the generic SUPL session. |
| >>>Total | O | Maximum total number of SUPL POS messages allowed for the downlink and uplink in the generic SUPL session. |
| >Activity Rate | O | Maximum rate of activity for the generic SUPL session. |
| >>Time | O | Time unit over which activity will be limited. |
| >>Uplink SUPL POS messages | O | Maximum number of SUPL POS messages that can be transferred on the uplink per unit of time. |
| >>Downlink SUPL POS messages | O | Maximum number of SUPL POS messages that can be transferred on the downlink per unit of time. |
| >>Total SUPL POS messages | O | Maximum number of SUPL POS messages that can be transferred on both the downlink and uplink per unit of time. |

In the design shown in Table 1, the lifetime or duration of a generic SUPL session may be defined by a time duration and/or a number of SUPL POS messages. The time duration may be given in any suitable unit of time, e.g., seconds, minutes, hours, etc. The number of allowed SUPL POS messages may be defined for the uplink, or the downlink, or both the uplink and downlink. The duration of the generic SUPL session may also be defined as a combination of time duration and the number of SUPL POS messages. In this case, the generic SUPL session may terminate based on whichever condition occurs first. The duration of a generic SUPL session may also be limited in other manners, such as by the number of LPP/TIA-801 messages, the total number of octets of data transferred in each direction, the number of positioning activities (which may be defined at the positioning level), etc. These quantities may be specified for the entire duration of the generic SUPL session.

In the design shown in Table 1, the activity rate of a generic SUPL session may be defined to allow for throttling of positioning activities during the generic SUPL session. Limiting the rate of positioning activities may be useful to avoid congestion in a SET, an SLP, or a network and to restrict the service rate to a SUPL agent (e.g., according to subscription limitations). The activity rate may be limited based on the number of SUPL POS messages, the number of octets of data transferred, the number of new positioning activities initiated, etc. These quantities may be specified for a particular unit of time (e.g., 10 seconds, 1 minute, 10 minutes, etc.) and may be specified for one direction (e.g., either the downlink or uplink) or both directions. In one design, if one entity (e.g., the entity that initiated the generic SUPL session) attempts to exceed a predetermined limit, then the other entity may slow down its response rate, or truncate its response content, or reject a request for a new positioning activity (e.g., at the positioning level) in order to restore the predetermined limit.

Figure 4:
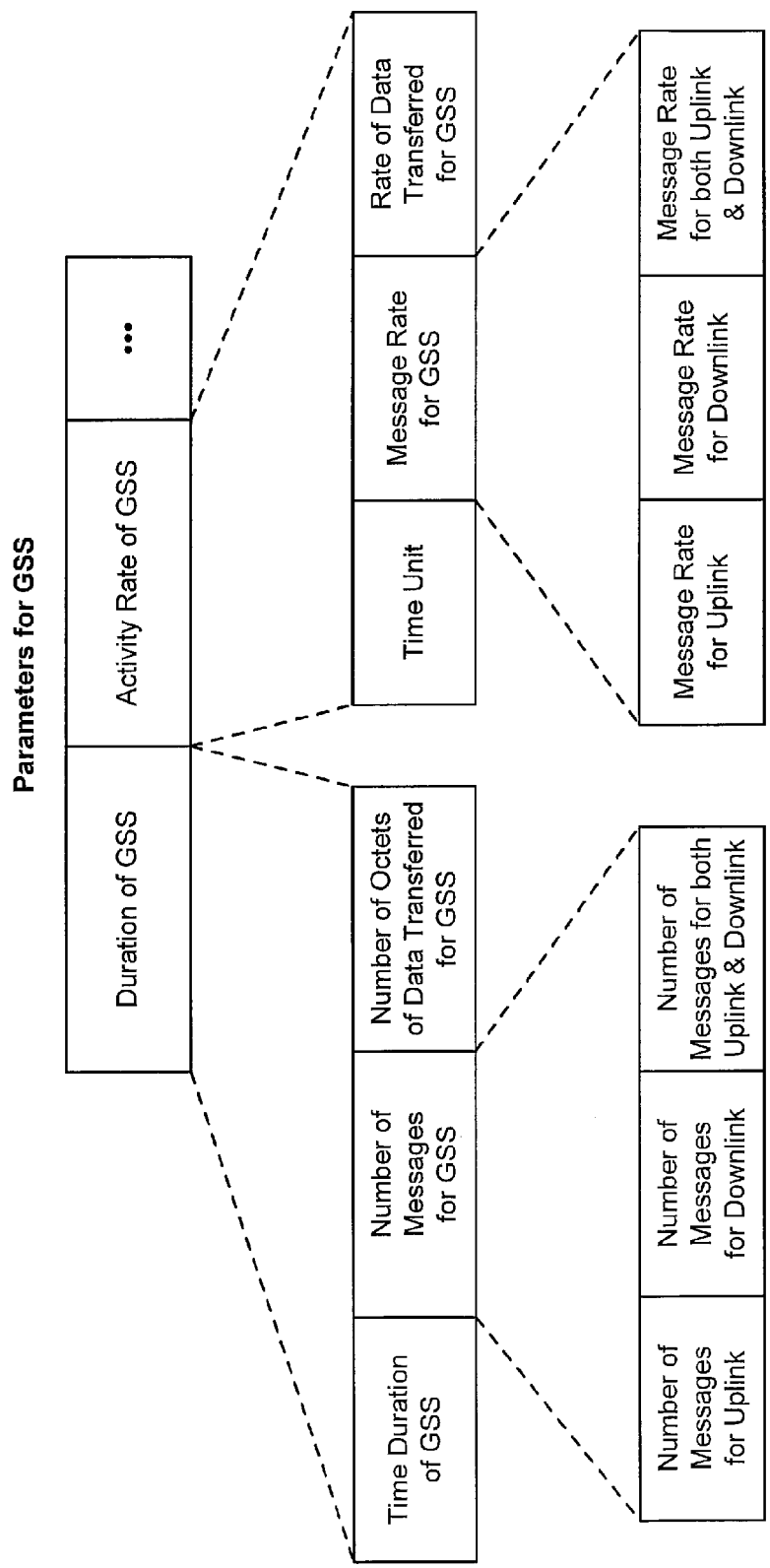
FIG. 4 shows exemplary parameters for a generic location session.

FIG. 4 shows a design of GSS parameters for a generic SUPL session. The design in FIG. 4 is similar to the design shown in Table 1. A generic SUPL session may be associated with a particular duration and optionally a particular activity rate. The duration of the generic SUPL session may be given by a time duration, a number of messages, a number of octets of data transferred, etc. The activity rate may be given by a particular time unit, a particular message rate, a particular data transfer rate, etc. Each quantity may be defined for the downlink, or the uplink, or both the downlink and uplink.

In the design shown in Table 1 and FIG. 4, the parameters for a generic SUPL session may not include ULP parameters related to positioning capabilities of a SET and an SLP. The SET and SLP may exchange their positioning capabilities for positioning protocols (e.g., LPP/LPPe and/or TIA-801) at the beginning of a generic SUPL session (e.g., as shown in FIG. 2 or 3), or in the first positioning activity, or in a previous generic SUPL session or in some other previous SUPL session.

A generic SUPL session described herein may provide various advantages. First, the generic SUPL session may allow flexible invocation of positioning activities by a SET, a function which is lacking in SUPL 2.0 and earlier and which is useful to implement new features and location services in SUPL 3.0 and later. For example, a generic SUPL session may be used to support a location service that is triggered when a target SET has moved by a certain amount from the last location, a location service that is triggered when the speed of the target SET exceeds a speed threshold, a location service that is triggered when two SETs are within a particular range, etc. Second, the generic SUPL session may reduce signaling overhead and the need to repeatedly perform authentication and privacy and/or subscription verification when a SUPL agent desires location services. Third, the generic SUPL session may allow positioning activities to be guaranteed in advance with allocation of necessary resources in the SET or SLP. Fourth, the generic SUPL session may enable new types of triggered and periodic location services to be efficiently and rapidly deployed by the SET and SLP, without the need to standardize and implement these at the SUPL level. Fifth, the generic SUPL session may be associated with a particular SUPL agent, which may then allow the SET or SLP to discriminate between SUPL agents when establishing a new generic SUPL session. Sixth, the generic SUPL session may support new types of triggered and periodic capabilities at the positioning level (e.g., in LPPe). In contrast, SUPL 2.0 and earlier restrict the positioning level to single shot activity only.

Figure 5:
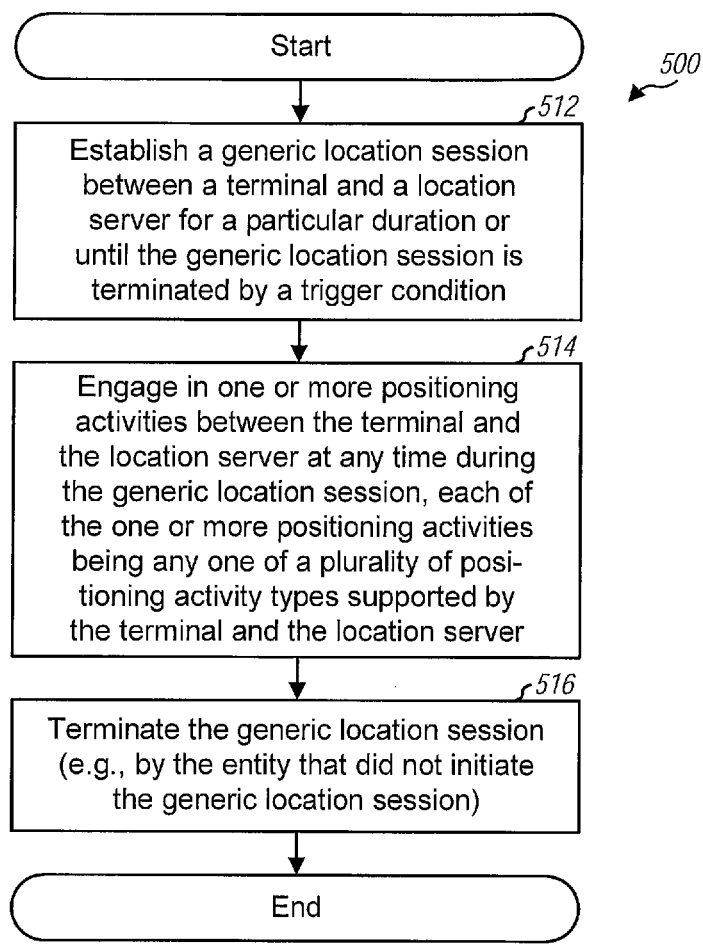
FIG. 5 shows a process for supporting location services via a generic location session.

FIG. 5 shows a design of a process 500 for supporting (e.g., obtaining or providing) location services. Process 500 may be performed by either a terminal/SET or a location server/SLP. A generic location session between a terminal (e.g., a SET) and a location server (e.g., an SLP) may be established for a particular duration or until the generic location session is terminated by a trigger condition (block 512). The terminal and the location server may engage in one or more positioning activities at any time during the generic location session (block 514). Each positioning activity may be any one of a plurality of positioning activity types supported by the terminal and the location server. In one design, the generic location session may comprise a generic SUPL session. For block 514, SUPL POS messages may be exchanged between the terminal and the location server for each positioning activity. The SUPL POS messages may transport positioning messages used to carry out the positioning activity. The generic location session may be terminated upon expiration of the particular duration of the generic location session or in response to a trigger condition (block 516).

In one design, the generic location session can be initiated by either the terminal or the location server. The terminal and the location server may be two entities involved in the generic location session. In one design, one entity may initiate the generic location session, and the other entity may send an end message to indicate termination of the generic location session. For example, the terminal may initiate the generic location session, and the location server may send an end message, as shown in FIG. 2. Alternatively, the location server may initiate the generic location session, and the terminal may send an end message, as shown in FIG. 3.

In one design, the terminal may be authenticated by the location server during establishment of the generic location session and may not be authenticated by the location server for each positioning activity. Alternatively or additionally, the location server may be authenticated by the terminal during session establishment and may not be authenticated by the terminal for each positioning activity. Other overhead tasks may also occur during session establishment and not occur for each positioning activity.

In one design, at least one parameter for the generic location session may be exchanged between the terminal and the location server during session establishment. In one design, the at least one parameter may comprise the particular duration of the generic location session, which may be given by a time duration, a number of positioning activities, a number of messages (e.g., a number of SUPL POS messages), a number of octets of data, some other quantity, or a combination thereof. In one design, the at least one parameter may comprise an activity rate during the generic location session. The activity rate may be given by a number of positioning activities per unit time, a number of messages per unit time, a number of octets of data transferred per unit time, some other quantity, or a combination thereof. The at least one parameter for the generic location session may also comprise other types of parameters.

In one design, the one or more positioning activities may comprise request and delivery of assistance data, request and delivery of the current location of the terminal, request and delivery of measurements or a location estimate, request and delivery of positioning capabilities, unsolicited transfer of positioning capabilities, assistance data or location information, some other positioning activity, or a combination thereof.

In one design, process 500 may be performed by the terminal. The terminal may initiate the generic location session for a terminal-initiated generic location session. The terminal may initiate a positioning activity only if the terminal initiated the generic location session. Alternatively, the terminal may initiate a positioning activity regardless of whether the terminal or the location server initiated the generic location session. The terminal may send its capabilities to the location server and may receive the capabilities of the location server during session establishment. The capabilities of each entity may comprise positioning protocols supported by that entity. Positioning capabilities for any positioning protocol may be exchanged during session establishment or within a positioning activity, e.g., within the first positioning activity in the generic location session. In one design, the terminal may receive a reinit message (e.g., a SUPL REINIT message) from the location server prior to a positioning activity and, in response, may establish a secure connection to the location server for the positioning activity. In one design, the terminal may receive an end message from the location server and, in response, may terminate the generic location session and release resources for the generic location session.

In another design, process 500 may be performed by the location server. The location server may initiate the generic location session for a network-initiated generic location session. For example, the location server may receive a location request from an LCS client and, in response, may initiate the generic location session. The location server may initiate a positioning activity only if the location server initiated the generic location session. Alternatively, the location server may initiate a positioning activity regardless of whether the location server or the terminal initiated the generic location session. The location server may send its capabilities to the terminal and may receive the capabilities of the terminal during session establishment. In one design, the location server may determine that the terminal does not have a secure connection to the location server for a positioning activity and, in response, may send a reinit message to the terminal prior to the positioning activity to trigger the terminal to establish a secure connection to the location server. In one design, the location server may receive an end message from the terminal and, in response, may terminate the generic location session and release resources for the generic location session.

Figure 6:
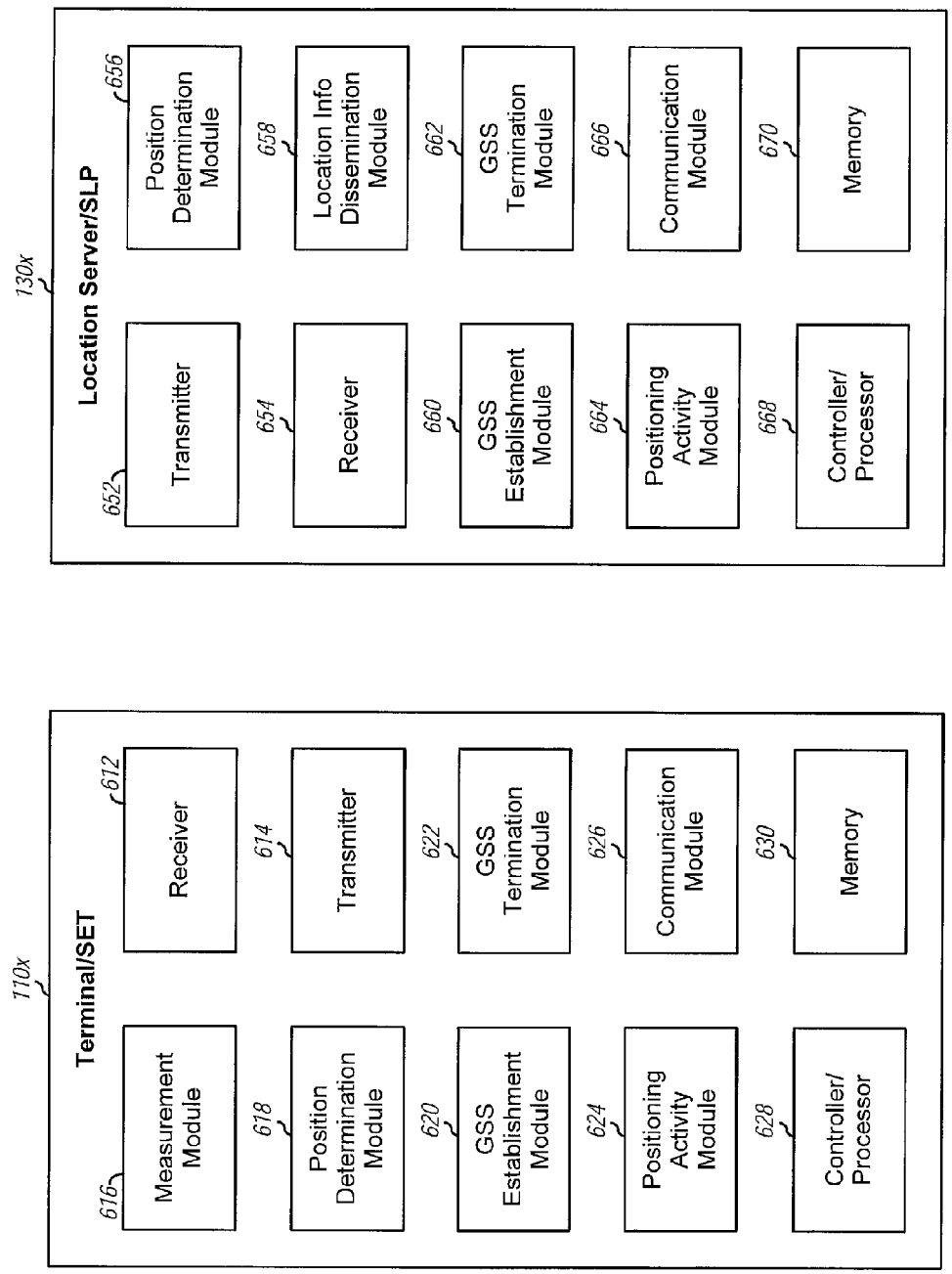
FIG. 6 shows a block diagram of a terminal and a location server.

FIG. 6 shows a block diagram of a design of a terminal/SET 110X and a location server/SLP 130X. Terminal 110X may be one design of terminal 110 in FIG. 1. Location server 130X may be one design of SLP 130a, 130b, or 130c in FIG. 1.

Within terminal 110X, a receiver 612 may receive signals from base stations, satellites, and/or other transmitting entities. A transmitter 614 may transmit signals to base stations and/or other receiving entities. A module 616 may make measurements on received signals for use to determine the location of terminal 110X. A module 618 may determine the location of terminal 110X based on measurements and/or other information. A module 620 may participate in establishment of a generic location session for terminal 110X and may exchange messages with location server 130X for session establishment. A module 622 may terminate a generic location session, e.g., due to expiration of the duration of the generic location session or reception of an end message from location server 130X. A module 624 may participate in positioning activities, e.g., exchange messages with location server 130X. A module 626 may support communication with base stations, location servers, etc. The various modules within terminal 110X may operate as described above. A controller/processor 628 may direct the operation of various modules within terminal 110X. A memory 630 may store data and program codes for terminal 110X. The modules and/or controller 628 within terminal 110X may perform processing for terminal 110 in message flow 200 in FIG. 2, message flow 300 in FIG. 3, process 500 in FIG. 5, and/or other processes for the techniques described herein.

Within location server 130X, a transmitter 652 and a receiver 654 may support bi-directional communication with base stations and/or other entities to support exchange of messages with terminal 110X and/or other terminals for location services. A module 656 may determine the location of terminal 110X based on measurements and/or other information available for terminal 110X. A module 658 may provide location information (e.g., a location estimate) for terminal 110X to LCS clients (e.g., SUPL agents). A module 660 may participate in establishment of a generic location session for terminal 110X and may exchange messages with terminal 110X for session establishment. A module 662 may terminate a generic location session for terminal 110X, e.g., due to expiration of the duration of the generic location session or reception of an end message from terminal 110X. A module 664 may participate in positioning activities, e.g., exchange messages with terminal 110X. A module 666 may support communication with base stations, other location servers, etc. The various modules within location server 130X may operate as described above. A controller/processor 668 may direct the operation of various modules within location server 130X. A memory 630 may store data and program codes for location server 130X. The modules and/or controller 668 within location server 130X may perform processing for location server 130 in message flow 200 in FIG. 2, message flow 300 in FIG. 3, process 500 in FIG. 5, and/or other processes for the techniques described herein.

In an exemplary design, an apparatus supporting location services comprises (i) means for establishing a generic location session between a terminal and a location server for a particular duration or until the generic location session is terminated by a trigger condition and (ii) means for engaging in one or more positioning activities between the terminal and the location server at any time during the generic location session. Each of the one or more positioning activities may be any one of a plurality of positioning activity types supported by the terminal and the location server.

In another exemplary design, an apparatus for supporting location services comprises at least one processor configured to establish a generic location session between a terminal and a location server for a particular duration or until the generic location session is terminated by a trigger condition, and to engage in one or more positioning activities between the terminal and the location server at any time during the generic location session. Each of the one or more positioning activities may be any one of a plurality of positioning activity types supported by the terminal and the location server.

In yet another exemplary design, a computer program product comprises a non-transitory computer-readable medium comprising (i) code for causing at least one computer to establish a generic location session between a terminal and a location server for a particular duration or until the generic location session is terminated by a trigger condition and (ii) code for causing the at least one computer to engage in one or more positioning activities between the terminal and the location server at any time during the generic location session. Each of the one or more positioning activities may be any one of a plurality of positioning activity types supported by the terminal and the location server.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of supporting location services, comprising:
   establishing a generic location session between a terminal and a location server, wherein administration functions are to be performed one time for an entirety of the generic location session, the administrative functions comprising authentication or secure session establishment, or a combination thereof, wherein the generic location session has a particular duration or is capable of being terminated by a trigger condition, the generic location session being initiated via a transmission of a protocol initiation message between the terminal and the location server, the protocol initiation message including a service request specifying that the generic location session is generic, wherein the generic location session is identified by a session ID, and the generic location session is capable of supporting a plurality of location services; and
   engaging in a plurality of positioning activities between the terminal and the location server during the generic location session, wherein each of the one or more positioning activities comprises a positioning activity type supported by the terminal and the location server, and wherein the plurality of positioning activities comprises at least two different types of triggered location services.

2. The method of claim 1, wherein the generic location session is capable of being initiated by the terminal or the location server.

3. The method of claim 1, wherein the terminal and the location server comprise two entities involved in the generic location session, wherein one of the two entities initiates the generic location session by sending the protocol initiation message, and wherein the other one of the two entities sends an end message to indicate termination of the generic location session.

4. The method of claim 1, wherein the terminal is authenticated by the location server during establishment of the generic location session and is not authenticated by the location server for each of the positioning activities.

5. The method of claim 1, wherein the location server is authenticated by the terminal during establishment of the generic location session and is not authenticated by the terminal for each of the positioning activities.

6. The method of claim 1, wherein the establishing the generic location session comprises exchanging at least one parameter for the generic location session between the terminal and the location server.

7. The method of claim 6, wherein the at least one parameter comprises the particular duration of the generic location session.

8. The method of claim 7, wherein the particular duration of the generic location session is given by a time duration, a number of positioning activities, a number of messages, a number of octets of data transferred, or a combination thereof.

9. The method of claim 7, wherein the particular duration of the generic location session is given by a time duration and a number of messages, and wherein the generic location session terminates upon reaching the time duration or the number of messages, whichever occurs first.

10. The method of claim 6, wherein the at least one parameter comprises an activity rate during the generic location session.

11. The method of claim 10, wherein the activity rate is given by a number of positioning activities per unit time, a number of messages per unit time, a number of octets of data transferred per unit time, or a combination thereof.

12. The method of claim 1, wherein the generic location session comprises a generic Secure User Plane Location (SUPL) session, and wherein the engaging in one or more positioning activities comprises exchanging SUPL POS messages between the terminal and the location server for each of positioning activities, the SUPL POS messages transporting positioning messages used to carry out each positioning activity.

13. The method of claim 1, wherein the positioning activities comprise at least request and delivery of assistance data, request and delivery of a current location of the terminal, request and delivery of measurements or a location estimate, request and delivery of positioning capabilities, unsolicited transfer of positioning capabilities, unsolicited transfer of assistance data, unsolicited transfer of location information, or a combination thereof.

14. The method of claim 1, wherein the establishing the generic location session comprises exchanging, between the terminal and the location server, capabilities of the terminal and capabilities of the location server.

15. The method of claim 14, wherein the capabilities of the terminal comprise one or more positioning protocols supported by the terminal, and wherein the capabilities of the location server comprise one or more positioning protocols supported by the location server.

16. The method of claim 1, further comprising:
    exchanging, between the terminal and the location server, capabilities of the terminal and capabilities of the location server related to a positioning protocol during performance of a first positioning activity.

17. The method of claim 1, wherein the establishing the generic location session and the engaging in one or more positioning activities are performed by the terminal.

18. The method of claim 17, further comprising: initiating the generic location session by the terminal.

19. The method of claim 17, further comprising: initiating a positioning activity by the terminal.

20. The method of claim 17, further comprising:
    establishing a secure connection to the location server, in response to receiving a re-initialization message, for the positioning activity.

21. The method of claim 17, further comprising:
    receiving an end message from the location server; and
    terminating the generic location session and releasing resources for the generic location session by the terminal in response to receiving the end message.

22. The method of claim 1, wherein the establishing the generic location session and the engaging in the positioning activities are performed by the location server.

23. The method of claim 22, further comprising:
initiating the generic location session by the location server.

24. The method of claim 22, further comprising:
receiving a location request from a location services client; and
initiating the generic location session by the location server in response to receiving the location request.

25. The method of claim 22, further comprising:
initiating a first positioning activity by the location server.

26. The method of claim 22, further comprising:
determining that the terminal does not have a secure connection to the location server for a first positioning activity; and
sending a re-initialization message to the terminal prior to the first positioning activity to trigger the terminal to establish a secure connection to the location server.

27. The method of claim 1, wherein the generic location session between the terminal and the location server is established to exist until the generic location session is terminated by the trigger condition.

28. The method of claim 1, wherein the generic location session is capable of supporting triggered location services or periodic location services.

29. An apparatus for supporting location services, comprising:
means for establishing a generic location session between a terminal and a location server, wherein administration functions are to be performed one time for an entirety of the generic location session, the administrative functions comprising authentication or secure session establishment, or a combination thereof, wherein the generic location session has a particular duration or is capable of being terminated by a trigger condition, the generic location session being initiated via a transmission of a protocol initiation message between the terminal and the location server, the protocol initiation message including a service request specifying that the generic location session is generic, wherein the generic location session is identified by a session ID, and the generic location session is capable of a plurality of location services; and
means for engaging in a plurality of positioning activities between the terminal and the location server during the generic location session, wherein each of the one or more positioning activities comprise a positioning activity type supported by the terminal and the location server, and wherein the plurality of positioning activities comprises at least two different types of triggered location services.

30. The apparatus of claim 29, wherein the terminal and the location server comprise two entities involved in the generic location session, wherein one of the two entities initiates the generic location session, and wherein the other one of the two entities sends an end message to indicate termination of the generic location session.

31. The apparatus of claim 29, wherein the means for establishing the generic location session comprises means for exchanging at least one parameter for the generic location session between the terminal and the location server, and wherein the at least one parameter comprises the particular duration of the generic location session.

32. The apparatus of claim 29, further comprising: means for initiating the generic location session by the terminal.

33. The apparatus of claim 29, further comprising: means for initiating the generic location session by the location server.

34. An apparatus for supporting location services, comprising: at least one processor to:
establish a generic location session between a terminal and a location server, wherein administration functions are to be performed one time for an entirety of the generic location session, the administrative functions comprising authentication or secure session establishment, or a combination thereof, wherein the generic location session has a particular duration or is capable of being terminated by a trigger condition, the generic location session being initiated via a transmission of a protocol initiation message between the terminal and the location server, the protocol initiation message including a service request specifying that the generic location session is generic, wherein the generic location session is identified by a session ID, and the generic location session is capable of supporting a plurality of location services; and
engage in a plurality of positioning activities between the terminal and the location server during the generic location session, wherein each of the one or more positioning activities comprise a positioning activity type supported by the terminal and the location server, and wherein the plurality of positioning activities comprises at least two different types of triggered location services.

35. The apparatus of claim 34, wherein the terminal and the location server comprise two entities involved in the generic location session, wherein one of the two entities initiates the generic location session, and wherein the other one of the two entities sends an end message to indicate termination of the generic location session.

36. The apparatus of claim 34, wherein the at least one processor is configured to exchange at least one parameter for the generic location session between the terminal and the location server, and wherein the at least one parameter comprises the particular duration of the generic location session.

37. The apparatus of claim 34, wherein the at least one processor is configured to initiate the generic location session by the terminal.

38. The apparatus of claim 34, wherein the at least one processor is configured to initiate the generic location session by the location server.

39. An article comprising: a non-transitory computer-readable medium to store computer-readable instructions capable of being executed by one or more processors to:
establish a generic location session between a terminal and a location server, wherein administration functions are to be performed one time for an entirety of the generic location session, the administrative functions comprising authentication or secure session establishment, or a combination thereof, wherein the generic location session has a particular duration or is capable of being terminated by a trigger condition, the generic location session being initiated via a transmission of a protocol initiation message between the terminal and the location server, the protocol initiation message including a service request specifying that the generic location session is generic, wherein the generic location session is identified by a session ID, and the generic location session is capable of supporting a plurality of location services; and engage in a plurality of positioning activities between the terminal and the location server during the generic location session, wherein each of the one or more positioning activities comprise a positioning activity type supported by the terminal and the location server, and wherein the plurality of positioning activities comprises at least two different types of triggered location services.

* * * * *